United States Patent

Robertson, Jr.

[15] 3,668,290

[45] June 6, 1972

[54] COMBINATION COIN TELEPHONE AND EXTENSION CIRCUIT

[72] Inventor: Ralston Hodges Robertson, Jr., Bayou La Batre, Ala.

[73] Assignee: Bell Telephone Laboratories, Incorporated, Murray Hill, N.J.

[22] Filed: July 22, 1970

[21] Appl. No.: 57,154

[52] U.S. Cl. ....179/6.3 R, 179/17 C

[51] Int. Cl. ....H04m 17/00

[58] Field of Search ....179/6.3, 17 B, 1 H, 17 C, 81 R, 27 FH

[56] References Cited

UNITED STATES PATENTS 2,847,512 8/1958 Crabtree ....179/27 FH
1,893,323 1/1933 Crocker ....179/27 FH
2,549,719 4/1951 Stehlik ....179/27 FH
1,756,102 4/1930 Rosekrans ....179/27 FH
3,130,272 4/1969 Liberman ....179/1 H
2,895,010 7/1959 Lomax ....179/6.3
3,499,121 3/1970 McIntosh ....179/17 B
3,514,544 5/1970 Chambers ....179/17 B

*Primary Examiner*—William C. Cooper
*Assistant Examiner*—Tom D'Amico
*Attorney*—R. J. Guenther and Edwin B. Cave

[57] ABSTRACT

A circuit for connecting an extension telephone across the terminals of a coin telephone employs the combination of an in-line relay in parallel with a solid state switch to ensure access to the telephone line by the coin telephone irrespective of whether the extension is in use and to preclude monitoring of the coin telephone by the extension.

5 Claims, 4 Drawing Figures

INVENTOR
R.H. ROBERTSON, JR.
BY [signature]
ATTORNEY

COMBINATION COIN TELEPHONE AND EXTENSION CIRCUIT

BACKGROUND OF THE INVENTION

1. Field of the Invention

This invention relates to coin operated telephones and more particularly to such telephones employed in combination with an extension telephone set sharing a single subscriber's line.

2. Description of the Prior Art

It is often desirable to employ a nonsignaling extension telephone set in combination with a coin operated set, both sets being connected at the same premises to a single, common subscriber's line. Typically, such arrangements are employed in small business establishments such as gas stations and small restaurants or bars and the like where it is desirable for the proprietor to be able to answer an incoming call to a semipublic pay phone by picking up a conveniently located extension phone, rather than proceeding to the coin phone itself. In known combinations of this type, however, a number of problems are introduced as a result of the manner in which the extension phone is connected to the line. In some instances, these problems are sufficiently acute to outweigh the added convenience that the combination is designed to provide.

One such problem, for example, occurs if a customer who is unaware that the extension phone is in use takes the coin phone off-hook and deposits a coin. Extraneous current paths are thereby established from ring to tip and from ring to ground and as a result the totalizer in the coin telephone is blocked from restoring to its home position. Moreover, an a-c short is completed across the speech network of the coin telephone. This shorting path is conventionally employed, but only momentarily, during totalizer reset to prevent the customer from hearing electronically generated coin signals. Under the conditions described, however, the short becomes a permanent connection which places both the coin telephone and the extension temporarily out of service. Although this situation can be remedied by the extension customer going on-hook long enough to restore the totalizer to its normal state, placing the coin telephone on-hook at the same time may well be construed as an abandoned call by the central office, thus prematurely terminating the call.

A similar but more severe problem is encountered when the coin telephone customer attempts normal operation with the extension customer already on the line, if the particular connecting central office employs reversed polarity battery with a positive potential on the ring lead. In that case the trouble condition cannot be cleared by momentary disconnection of the extension and instead it is necessary for all three parties involved to abandon the call in order to restore conditions to normal.

The problems outlined above can create both inconvenience and customer annoyance. The most critical problem in prior art installations, however, is the compromise of coin phone privacy since the extension phone can monitor both incoming and outgoing calls. While the situation is somewhat mitigated by informing the pay telephone customer of the monitoring capability by displaying suitable information at the pay station, such information clearly provides no real solution.

Accordingly, a broad object of the invention is to overcome or alleviate the problems indicated which are inherent in prior art arrangements involving the connection of a coin telephone and a nonsignaling extension telephone to a common line.

SUMMARY OF THE INVENTION

The stated object and additional objects are achieved in accordance with the principles of the invention by connecting one side of the extension telephone network to a corresponding lead of the telephone line and by connecting the other extension lead to the other side of the line by way of a special connecting network that includes a relay, a pair of transistor switches and associated circuit components. With this arrangement, if the coin phone is placed off-hook initially, the transistors are held in the OFF condition and the relay is operated. Contacts of the relay are thus actuated to disconnect the extension from the line which precludes monitoring by the extension.

If, on the other hand, the coin phone is placed off-hook while the extension is in use, the relay is shunted by the conducting transistors and both parties are connected to the line. In accordance with the invention, however, the extension user is provided with a nonlocking pushbutton switch which ensures against totalizer lockup and also effects disconnection of the extension from the line without causing an a-c short across the line.

DETAILED DESCRIPTION

Figure 1:
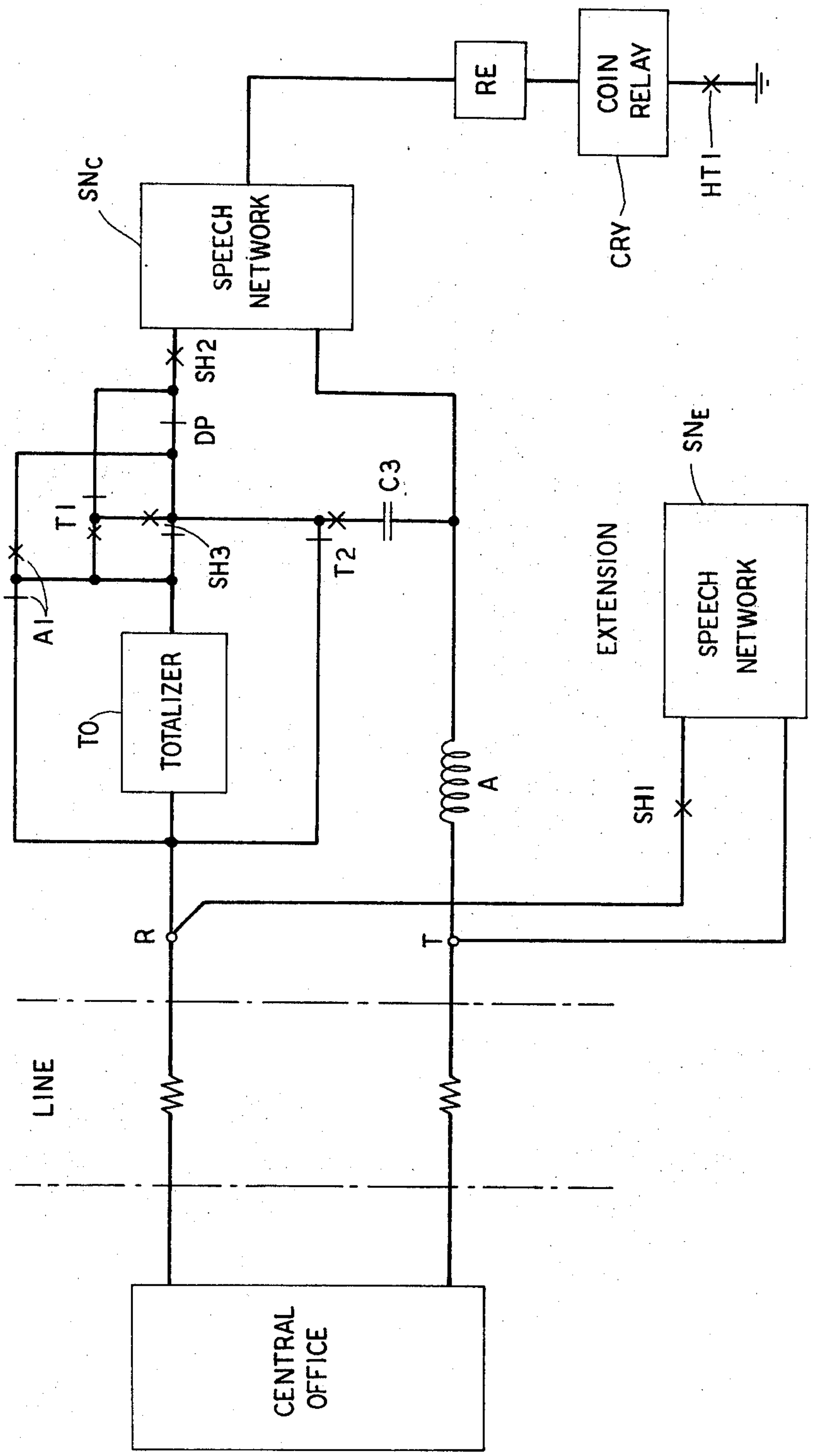
FIG. 1 is a schematic circuit diagram, partially in block form, showing the connection of a coin telephone and an associated extension to a common telephone line in accordance with the prior art.

A brief discussion of the prior art circuit of FIG. 1 serves as a useful preface to a detailed description of the invention inasmuch as it clarifies the specific problems and shortcomings that the principles of the invention meet. That portion of FIG. 1 designated STATION is meant to include all elements of a conventional coin telephone set of the general type disclosed by A. Busala, R. R. Stokes and L. A. Strommen in U. S. Pat. No. 3,435,146 issued Mar. 25, 1969. The principal elements are a speech network $SN_C$, a totalizer mechanism TO, a reset relay RE and a coin relay CRY. The specific function and construction of these elements are well known, being described, for example in the Busala et al. patent cited above, in U. S. Pat. No. 3,239,609 issued to E. R. Andregg and K. E. Voyles on Mar. 8, 1966, and in U. S. Pat. No. 3,146,312 issued on Aug. 25, 1964 to E. R. Andregg and L. A. Strommen. Contacts illustrated in the coin telephone of FIG. 1 include transfer contacts A1 of the conventional A relay, dial contacts DP, switch hook contacts SH2 and SH3, the cam operated totalizer contacts T1 and T2 and the hopper trigger contacts HT1.

The extension phone is illustrated diagrammatically by its speech network block $SN_E$ and its switch hook SH1. The line and central office connections are conventional with ground normally on the tip lead T and negative battery on the ring lead R.

Outgoing Call from Coin Station

As indicated above, and as shown in FIG. 1, when the extension is connected in parallel with the coin phone, it is possible to originate a call at the coin station and to use the extension for the remainder of the call. Under the conditions shown in FIG. 1, if a coin telephone customer removes the handset at the coin telephone thus operating switch hook contacts SH2 and SH3, an additional path from ring to tip is established through the normally closed totalizer contact T2, the switch hook contact SH2 and the coin telephone speech network $SN_C$. The customer at the coin telephone can then hear the conversation being conducted from the extension, and the customer would presumably wait, in accordance with posted instructions at the coin phone, until the extension is not in use before depositing money and placing a call. If, however, the coin telephone customer deposits a coin without recognizing that the extension is in use, or acts in ignorance of the posted instructions, the totalizer TO is driven off normal by the deposit and contacts T1, T2 and HT1 transfer. Under these conditions a ring-tip connection exists through the contacts A1, T1, SH3 and SH2 and the coin telephone speech network $SN_C$. Additionally, a path from ring to ground exists through the elements ahead of the network, as indicated above, and through the network $SN_C$, the coin relay CRY and the closed HT1 contact.

The three simultaneous current paths from ring to tip and from ring to ground which are established when the extension is connected, as shown, result in a number of undesirable conditions. First, the current through the A relay in the tip lead T drops below its operate limit, and as a result, the A1 contact cannot open to remove the shunt from the totalizer TO. Consequently, the totalizer is unable to restore or to return to its home position. Secondly, depending on loop length, the current in the ring lead R of the coin telephone may be below the minimum required for totalizer operation, in which case the totalizer T0 would be unable to restore regardless of the condition of the A relay. Additionally, the operated T2 contacts place the capacitor C3 across the networks $SN_C$ and $SN_E$ in both telephone sets. Under normal operating conditions, this capacitor is connected across the coin telephone speech network during totalizer readout to prevent the customer from hearing the electronic coin signals as he deposits coins. This condition normally is unrecognized by the customer owing to the fact that the capacitor connection is only momentary, approximately 200 milliseconds during each coin registration and readout. Because of the other conditions described above, however, the totalizer T0 does not restore and the a-c short is, in effect, made permanent which places both the extension and the coin telephone out of service.

In order to clear the out-of-service condition, the extension customer must hang up his telephone long enough to allow the totalizer T0 of the coin telephone to restore to its normal state thus removing the a-c short. The extension user must then go off-hook and ask the coin telephone customer to wait until his call is completed. This procedure for removing the trouble condition presents a problem in that if the user of the extension does not properly time the duration of the interval in which he is disconnected and the coin telephone customer has previously replaced his handset on-hook, it is possible for the central office to recognize an abandoned call and thus prematurely terminate the call. During this sequence of events, coins mistakenly deposited by the coin telephone customer remain stored in the hopper with the originating call deposit until the call at the extension is completed. Upon completion of the call at the extension, all coins stored in the hopper are collected, even though proper service has not been made available to the coin telephone customer.

Incoming Call-Normal Station Polarity

In the case in which an incoming call has been accepted by the extension, a path from ring to tip necessarily exists through the switch hook SH1 and the speech network $SN_E$. If during the conversation a customer attempts to place a call at the coin telephone, he will initially be in communication with the extension and the original calling party. As in the situation described above, if the coin telephone customer realizes that the line is busy, the proper procedure for him, in accordance with posted instructions, is to hang up. If he does not recognize the busy condition of the line, however, any coin deposited affects the transfer contact T2 in the totalizer T0 and the a-c short and totalizer lockup conditions occur exactly as described above in connection with the discussion of the condition that exists when a call is first initiated from the coin station. The extension customer must then use the same method outlined above to clear the trouble condition.

If coins have been deposited by mistake and assuming all parties have hung up at the conclusion of the incoming call, the coin telephone customer will receive coin service without any additional deposit. In this case, however, removal of the handset at the coin telephone results in a new ground start through the hopper trigger contacts HT1. These contacts remain operated owing to the coins previously deposited. No start can be obtained before all parties have abandoned, since conventional central office coin control circuits do not recognize money deposited in a coin telephone on an incoming connection as a service request. When a call is placed from the coin telephone in this manner after completion of the original incoming call, the switching system returns to the normal mode of operation.

Incoming Call-Station Polarity Reversed

Problems similar to those described above also occur in those telephone systems in which the polarity of tip and ring as seen from the called station is reversed, i.e., with positive potential on the ring lead. When the ring lead is positive for an incoming call answered at the extension and a coin telephone customer removes the handset during the call and deposits money, the totalizer contacts T2 transfer and the a-c short and totalizer lockup occur as in the arrangement previously described. In this case, however, the positive potential on the ring lead prevents operation of the polarity-sensitive totalizer and the A relay. As a result, the trouble condition cannot be cleared by momentary disconnection of the extension but instead, it is necessary for all three parties involved to abandon the call.

Privacy Problem

The sacrifice in individual privacy in prior art systems has been mentioned briefly above. It should be understood that the most troublesome aspect of the privacy problem concerns the capability of the extension phone to monitor the coin phone. It is this lack of privacy which is generally considered to be incompatible with the standards expected by coin telephone customers. With respect to possible breaches in the privacy of the extension phone user, the problem is not nearly so acute inasmuch as the extension phone is typically the proprietor's or the subscriber's own personal-convenience phone and he therefore is necessarily aware of the possibility of having his conversation monitored at the coin phone. Moreover, the likelihood of an attempt to monitor the coin phone by way of the extension would seem to greatly exceed the likelihood of the reverse situation.

Solution in Accordance with the Invention

Figure 2:
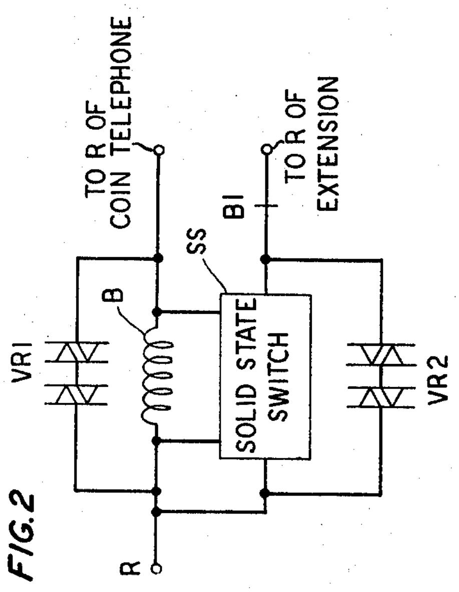
FIG. 2 is a schematic circuit diagram, partially in block form, of a connecting circuit in accordance with the invention.
Figure 3:
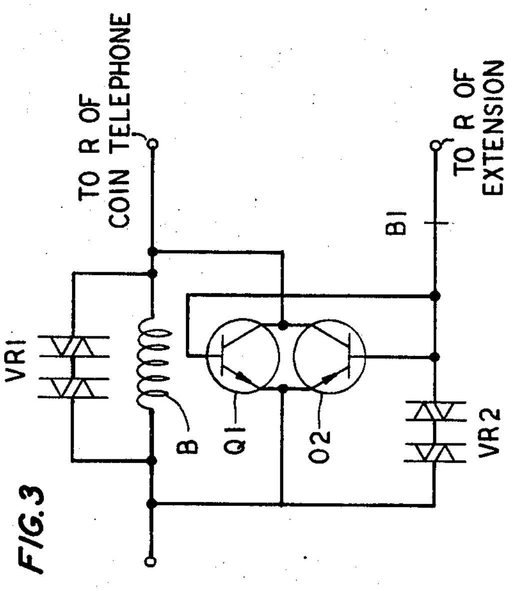
FIG. 3 is a complete schematic diagram of the circuit shown partially in block form in FIG. 2.

Problems outlined above are met, in accordance with the invention, by a connecting circuit of the general form shown in FIG. 2. There, the connection of the ring lead of the coin telephone to the ring line terminal R is made by way of a relay coil B shunted by the varistors VR1. In the case of the ring lead of the extension, connection to the ring terminal of the line is made by way of a break contact B1 of relay B and a solid state switch SS shunted in turn by the varistors VR2. Complete implementation of the circuit of FIG. 2 is shown in the circuit of FIG. 3 where a two-transistor switch employing transistors Q1 and Q2 performs as the solid state switch SS of FIG. 2. The embodiment of the circuit of FIG. 3 in a complete system is shown in FIG. 4.

Figure 4:
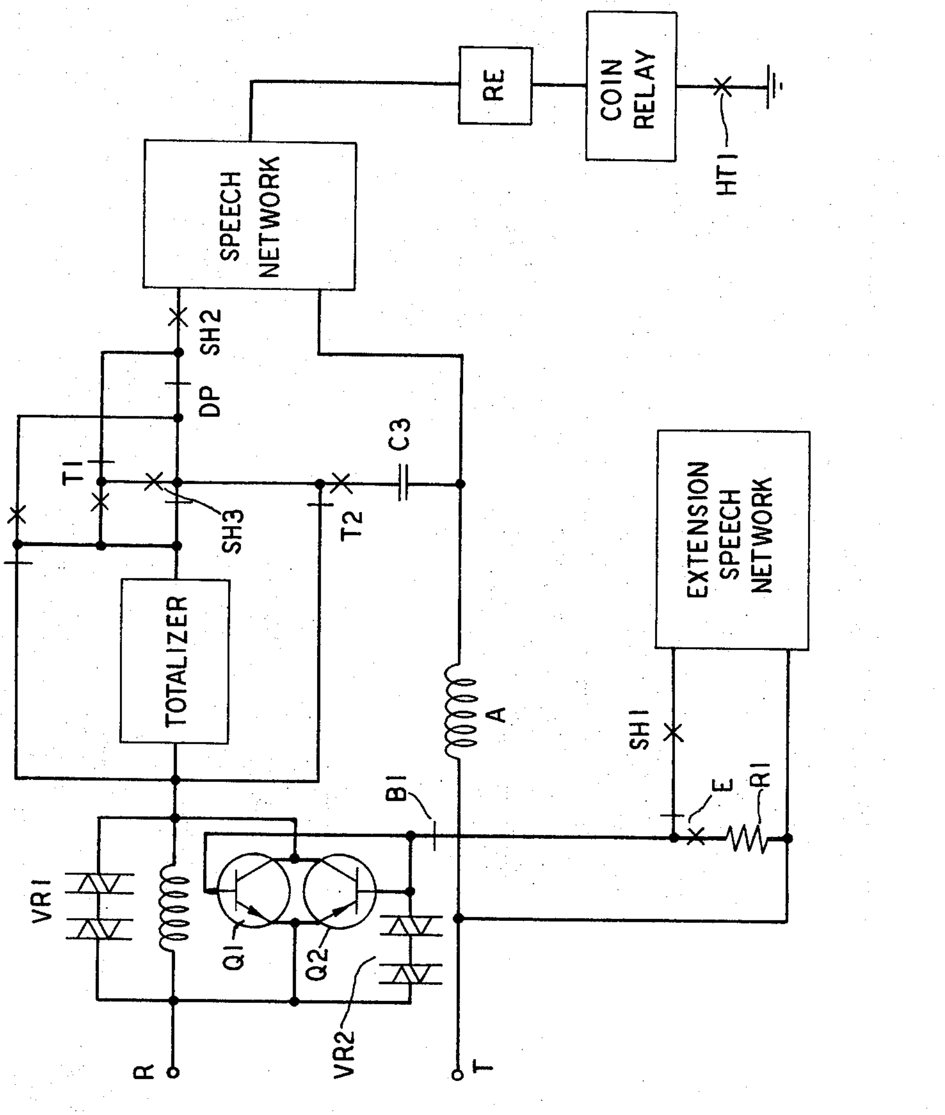
FIG. 4 is the circuit of FIG. 3 shown in combination with a conventional coin telephone set.

With reference now to FIG. 4, if the coin telephone is placed off-hook initially, the base leads of transistors Q1 and Q2 are disconnected from the tip lead by the extension switch hook SH1. Thus, both of the transistors are in the OFF or high impedance condition and the relay B will operate, disconnecting the extension by the operation of contact B1.

If the extension is in use initially, the voltages developed across the varistors VR1 forward bias the base-to-emitter junction of the npn transistor Q1 and reverse bias the pnp transistor Q2. If the coin telephone is placed off-hook while the extension is in use, transistor Q1 is saturated and relay B is shunted by the low collector-to-emitter resistance of this transistor. This action prevents the operation of relay B and both the extension and the coin telephone are connected to the line through varistors VR1 and VR2, respectively, which presents a low impedance at voice frequencies.

Ideally, at this time, the customer would hear the conversation and hang up. If he does not realize the line is busy, however, and deposits money, the a-c short and totalizer lockup discussed above occur. In order to allow the totalizer to read out, a nonlocking pushbutton switch E is installed across the extension. When the extension operator activates the switch E, the extension is removed from the line and is, in effect, replaced by a resistor R1. The resistance of R1 is chosen so that its connection to the base of transistor Q1 maintains it in its saturated condition, allowing the totalizer T0 to operate and preventing the central office from registering an abandoned call in the event that the coin telephone is placed on-hook while the switch E in the extension telephone is activated. When the switch E is operated, the A relay in the coin telephone is activated, the totalizer reads out and the T2 contacts return to normal. This action removes the capacitor C3 from the line, and at this point the customer can be given verbal instructions. As indicated above, the deposited money remains in the hopper until the established call is completed, at which time the coin telephone customer may obtain service for his previously deposited initial rate.

For an incoming call channeled through a central office which employs reversed polarity at the called station, the switching functions are performed by the pnp transistor Q2 in essentially the same manner as transistor Q1 under the previous conditions. With a reversed-polarity central office, i.e., ring lead negative and tip positive, totalizer readout into the talking circuit is not possible and the exclusion switch E is accordingly not recommended for use under such circumstances. It is necessary to provide priority for the coin telephone, however, and the circuit, with the exception of the switch and the resistor R1, may be used with this type of central office equipment.

It is to be understood that the embodiment described herein is merely illustrative of the principles of the invention. Various modifications thereto may be effected by persons skilled in the art without departing from the spirit and scope of the invention.

What is claimed is:

1. A circuit for connecting an extension telephone set across the line terminals of a coin telephone set comprising, in combination, means for ensuring access to a common telephone line by said coin telephone irrespective of whether said extension telephone is in use, and means for precluding monitoring of said coin telephone by said extension telephone whenever said coin telephone is in use initiated prior to an attempted use by said extension telephone, each of said means utilizing, in common, an in-line relay in parallel combination with solid state switching means, the coil of said relay being in series with one side of said telephone line, said coil being shunted by a first varistor and said switching means being shunted by a second varistor, a conducting path between said switching means and the speech network of said extension telephone set, said path including relay contacts responsive to the operation of said relay, said switching means comprising first and second transistors having the emitter electrodes thereof connected to one terminal of said relay coil and the collectors thereof connected to the other terminal of said relay coil, the base electrodes thereof being connected by way of said last-named contacts to the speech network of said extension telephone.

2. A circuit for connecting an extension telephone set across the line terminals of a coin telephone set comprising, in combination, means for ensuring access to a common telephone line by said coin telephone irrespective of whether said extension telephone is in use, and means for precluding monitoring of said coin telephone by said extension telephone whenever said coin telephone is in use initiated prior to an attempted use by said extension telephone, each of said means utilizing, in common, an in-line relay in parallel combination with solid state switching means, the coil of said relay being in series with one side of said telephone line, said coil being shunted by a first varistor and said switching means being shunted by a second varistor, a conducting path between said switching means and the speech network of said extension telephone set, said path including relay contacts responsive to the operation of said relay, said switching means comprising first and second transistors having the emitter electrodes thereof connected to one terminal of said relay coil and the collectors thereof connected to the other terminal of said relay coil, the base electrodes thereof being connected by way of said last-named contacts to the speech network of said extension telephone, wherein said second varistor is connected between said emitter electrodes and the base electrodes of said transistors.

3. A circuit for connecting an extension telephone across the line terminals of a coin telephone set comprising, in combination, a relay coil connected in series with the ring lead of said coin telephone, solid state switching means connected in shunt with said relay coil, a first varistor shunting said relay coil, a second varistor shunting said switching means, means connecting said switching means to the ring side of said extension telephone set, said last-named means including a break contact responsive to the operation of said relay.

4. Apparatus in accordance with claim 3 further including means manually operable at said extension telephone for providing a shunt resistive termination in place of the speech network of said extension telephone set, thereby to ensure against the lockup of the totalizer of said coin telephone and further ensuring disconnection of said extension set from the line without, however, establishing an a-c short across said line.

5. Apparatus in accordance with claim 4 wherein said switching means comprises first and second transistors each having the collector-emitter path thereof in shunt relation with said relay coil, said means connecting said switching means including a conducting path from a terminal common to the base electrodes of said transistors, through said break contact and through switch hook make contacts of said extension telephone.

* * * * *